April 19, 1938.   J. W. SMITH   2,114,480
BEARING
Filed Feb. 11, 1936
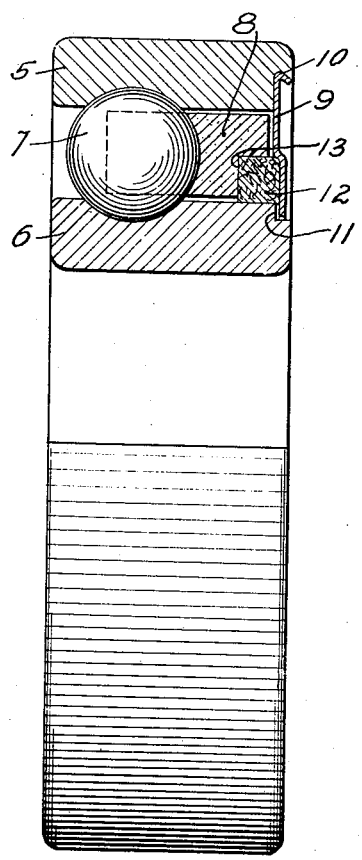
INVENTOR
JOHN W. SMITH
BY
Mitchell Bechtel
ATTORNEYS Patented Apr. 19, 1938

2,114,480

UNITED STATES PATENT OFFICE 2,114,480

BEARING

John W. Smith, New Britain, Conn., assignor to The Fafnir Bearing Company, New Britain, Conn., a corporation of Connecticut Application February 11, 1936, Serial No. 63,347

6 Claims. (Cl. 308—187)

My invention relates to an anti-friction bearing.

It is an object of the invention to provide a novel and improved form of seal for a bearing.

Another object is to provide novel means for holding the bearing retainer and assisting in sealing the bearing.

Another object is to provide very simple means for effectively holding a retainer in place on anti-friction bearing members.

Other objects and features of the invention will be hereinafter pointed out or will become apparent upon a reading of the specification.

The drawing is an edge view of an anti-friction bearing in quarter section illustrating a preferred form of the invention.

The bearing illustrated embodies an outer ring 5 and an inner ring 6, having raceways for anti-friction bearing members, such as balls 7, running in the raceways, as will be understood. It is now common practice to partially fill the raceways with balls or other anti-friction bearing members and provide a retainer and spacer for the anti-friction bearing members. I provide such a retainer 8, which may be made of metal or other suitable material and is preferably a solid annular ring having spaced pockets formed therein for the balls 7. Ordinarily retainers of the type indicated are provided with means, such as a second ring or retainer half, to be secured to the retainer 8, whereby the retainer is held in place. However, the assembling of such a retainer entails labor and the added weight of the second retainer half may be objectionable. I provide the retainer 8 and preferably leave the pockets open so that the retainer is merely set in place with the anti-friction bearing members in the pockets and spaced apart and retained by the retainer.

The retainer is held in place by improved means, preferably involving also means for sealing the bearing at one side. In the preferred form illustrated I employ a sheet metal seal plate 9, which may be secured to one of the rings, such as the outer ring, by being crimped into an undercut annular groove 10, as will be understood. The retainer plate 9 may extend completely across the space between said rings and into a rabbeted portion 11 on the opposite or inner ring. Between the retainer 8 and the seal plate 9 I interpose a seal ring 12, preferably of resilient absorbent material, such as felt. The retainer may be recessed or rabbeted, as indicated at 13, to hold the ring 12, and the latter abuts the plate 9 and the retainer 8 and serves to gently urge the latter in the direction of the balls 7. The ring 12 preferably also engages the outer circumferential surface of the inner bearing ring and forms a seal to prevent the escape of lubricant past the inner ring.

It will be noted that the seal plate 9 being rigidly secured to the outer ring forms a tight seal for the outer ring. Thus, the seal plate 9 and seal ring 12 provide an effective seal for the bearing and at the same time serve to hold the open retainer 8 in place on the anti-friction bearing members and tend to urge the retainer into engagement with the balls to the extent at least of taking up any looseness and obviating any rattle which might be occasioned by the retainer moving back and forth axially of the bearing when the bearing is in action.

My improved bearing is easy to assemble and the parts are all effectively held in place.

While the preferred form of the invention has been described in considerable detail it is to be understood that various changes may be made within the scope of the invention as defined in the appended claims.

I claim:

1. In a bearing, an outer bearing ring, an inner bearing ring, anti-friction bearing members interposed between said rings, a retainer for said anti-friction bearing members, said retainer including an annular member substantially filling the space between said rings and having spaced pockets for receiving and spacing said anti-friction bearing members, an abutment member secured to one of said rings, and a resilient member interposed between and engageable with said abutment member and said retainer and the other of said bearing rings, for the purpose described.

2. In a bearing, an outer bearing ring, an inner bearing ring, anti-friction bearing members interposed between said rings, a retainer for said anti-friction bearing members, a seal plate rigidly secured to one of said two bearing rings and bridging the space therebetween, and a resilient seal member interposed between said seal plate and said retainer and the other of said two bearing rings, for the purpose described.

3. In a bearing, an outer bearing ring, an inner bearing ring, anti-friction bearing members interposed between said rings, an open retainer including an annular member substantially filling the space between said bearing rings and having open sided pockets for holding and spacing said anti-friction bearing members, a seal plate carried by one of said bearing rings, and means interposed between said seal plate and said retainer for resiliently urging said open retainer into engagement with said anti-friction bearing members.

4. In a bearing, an outer bearing ring, an inner bearing ring, anti-friction bearing members interposed between said rings, an open retainer for said anti-friction bearing members, a seal plate rigidly secured to said outer bearing ring and extending across the space between said bearing rings, and a seal ring rotatably engaging said retainer and said inner bearing ring whereby said seal plate and said seal ring form a seal for both of said rings and serve to hold said open retainer in place.

5. In a bearing, an outer bearing ring, an inner bearing ring, anti-friction bearing members interposed between said rings, a retainer for said anti-friction bearing members, a seal ring rotatably engaging one of said bearing rings, said retainer having means for holding said seal ring, and a seal plate secured to the other of said bearing rings and engaging said seal ring whereby said seal plate and seal ring serve to hold said retainer in place.

6. In a bearing, an outer bearing ring, an inner bearing ring, anti-friction bearing members between said rings, a retainer for said bearing members insertable from one side of the bearing, an annular recess in the outer wall of said retainer toward the inner ring, a relatively porous yielding seal ring located partially within said recess and seated on the inner ring and projecting outwardly from said retainer, and a metallic seal plate rigidly secured to the outer ring and overstanding the adjacent side of the retainer and the seal ring and in side engagement with the latter.

JOHN W. SMITH.